United States Patent [19]

Honmyo

[11] Patent Number: 5,411,801
[45] Date of Patent: May 2, 1995

[54] PLATE-LIKE MAGNETITE PARTICLES AND PROCESS FOR PRODUCING THE SAME

[75] Inventor: Torayuki Honmyo, Uji, Japan
[73] Assignee: Toda Kogyo Corp., Hiroshima, Japan
[21] Appl. No.: 24,105
[22] Filed: Feb. 23, 1993

Related U.S. Application Data

[63] Continuation of Ser. No. 526,819, May 22, 1990, abandoned.

[30] Foreign Application Priority Data

May 31, 1989 [JP] Japan .................................. 1-140091

[51] Int. Cl.$^6$ ............................................. C01G 49/02
[52] U.S. Cl. ................................... 428/402; 423/632; 423/633; 423/634
[58] Field of Search ................. 428/402; 423/632, 633, 423/634

[56] References Cited

U.S. PATENT DOCUMENTS

| | | | |
|---|---|---|---|
| 4,024,232 | 5/1977 | Garberi et al. | 423/632 |
| 4,382,822 | 5/1983 | Mayer | 106/304 |
| 4,404,254 | 9/1983 | Franz et al. | 423/632 |
| 4,865,834 | 9/1989 | Tanihara et al. | 423/634 |

FOREIGN PATENT DOCUMENTS 306224  3/1989  Japan .

OTHER PUBLICATIONS

Patent Abstracts of Japan, vol. 13, No. 457 (C-644) (3805), Oct. 16, 1989 and JP-A-1 176 233 (Toda Kogyo).

Primary Examiner—D. S. Nakarani
Attorney, Agent, or Firm—Nixon & Vanderhye

[57] ABSTRACT

Disclosed herein are a process for producing poreless plate-like magnetite particles which have as large a plate ratio (average particle diameter/thickness) as possible and which are discrete each other, the process comprising the step of: obtained by oxidizing a suspension containing $FeCO_3$ obtained by reacting an aqueous ferrous salt solution and an aqueous alkali carbonate solution by passing an oxygen-containing gas therethrough, wherein the suspension is obtained by reacting a ferrous salt solution containing 0.2 to 5.0 mol % of a ferric salt, calculated as Fe(III), based on Fe(II) and an aqueous alkali carbonate the amount of which is so controlled that the equivalent ratio of an alkali carbonate to the Fe(II) and Fe(III) in the aqueous ferrous salt solution is not less than 1 and the following general formula is satisfied:

$$\text{Equivalent ratio} \left( \frac{CO_3^{2-} \text{ (mol)}}{Fe^{2+} \text{ (mol)}} \right) \leq \frac{0.13}{\left( \text{concentration of } FeCO_3 \text{ (mol/l)}^2 \right)} + 5.0,$$

and if necessary, 0.01 to 8.0 ml % of a water-soluble organic compound having a —COONa or —COOK group based on the Fe(II) and Fe(III) are added to any of the aqueous ferrous salt solution, the aqueous alkali carbonate solution and the suspension containing $FeCO_3$ before the oxidation, and poreless plate-like magnetite particle which has as large a plate ratio and are discrete each other.

4 Claims, 3 Drawing Sheets (X50000)

FIG. 1
(X50000)
FIG. 3
(X30000)
FIG. 4
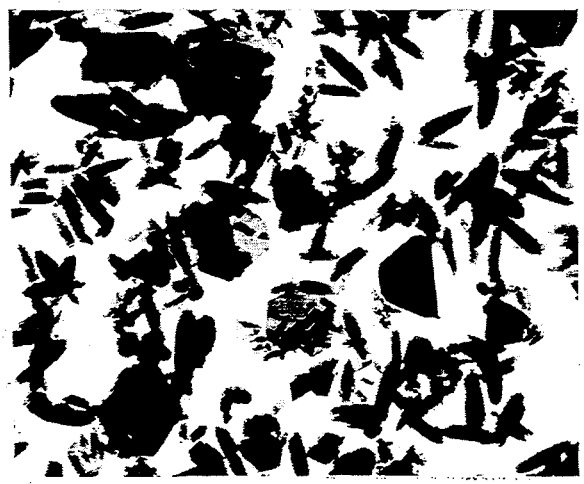
(X20000)

FIG. 6
(X30000)
FIG. 7
(X30000)
FIG. 8
(X20000)
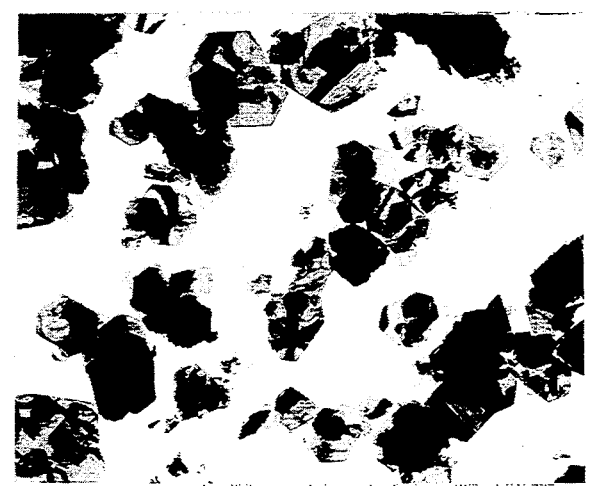

PLATE-LIKE MAGNETITE PARTICLES AND PROCESS FOR PRODUCING THE SAME

This is a continuation of application Ser. No. 07/526,819, filed May 22, 1990, now abandoned.

BACKGROUND OF THE INVENTION

The present invention relates to a process for producing poreless plate-like magnetite particles which have a large plate ratio (average particle diameter/thickness) and are discrete each other, directly from an aqueous solution and the plate-like magnetite particles.

The plate-like magnetite particles according to the present invention are chiefly used for electromagnetic wave absorbers, shields, anticorrosive coatings, toners, damper, sound insulator and magnetic recording material.

Plate-like magnetite particles are expected to be used in various technical fields by utilizing various properties such as the shape and the magnetic characteristics thereof.

This fact is described in Japanese Patent Publication No. 63-41853 (1988): "There is a possibility of using lamella magnetic iron oxide particles for a magnetic recording material such as magnetic tape, card and disk", and "Hexagonal lamella iron oxide particles having a magnetite or maghemite crystalline structure are also used for other purposes. . . . In a coating material, very remarkable parallel orientation of each particle is produced with respect to each other. Therefore, . . . it is possible to obtain very high packing density, and as a result, for example, the anticorrosive effect and the screening effect on electromagnetic interference increase, and the conductivity is enhanced". In Japanese Patent Application Laid-Open (KOKAI) No. 61-138959 (1986): "It has been found that when small plate-like or scale-like magnetizable particles are used as a magnetic component of one-component toner, it is scarcely by the intrinsic color of the magnetic component itself but mainly by the coloring agent having a strong color which is added thereto that the color of the toner is decided", and "It is possible to immediately convert the state of these particles into a good dispersed state in a binder or a binder solution merely by stirring them without consuming any special classifying energy".

Magnetite particles are generally dispersed in and mixed with a vehicle so as to be used as a coating, or are kneaded with and dispersed in a resin and molded so as to be used as a molded product.

In dispersing and mixing magnetite particles in and with a vehicle, or kneading and dispersing magnetite particles with and in a resin, the particles are required to have as a good dispersibility as possible in order to improve the properties and the working efficiency. For this purpose, magnetite particles are required not only to be in the form of a plate but also to have as large a plate ratio (average particle diameter/thickness) as possible, and be discrete each other and poreless.

As a process for producing plate-like magnetite particles, for example, a process of producing plate-like hematite particles from an aqueous solution by autoclaving an alkaline suspension containing ferric hydroxide or goethite and heat-treating the plate-like hematite particles in a reducing gas [refer to Japanese Patent Application Laid-Open (KOKAI) No. 51-28700 (1976), Japanese Patent Publication No. 63-41853 (1988)], a process of producing goethite particles by rapidly oxidizing an alkaline suspension containing ferrous hydroxide with a strong oxidizing agent or a process of producing goethite particles by reacting ferric iron with an alkali in an aqueous medium to produce ferric hydroxide and autoclaving the said ferric hydroxide, thereby forming plate-like goethite particles from an aqueous solution, and the heat-treating the goethite particles in a reducing gas after dehydrating the plate-like goethite particles under heating, if necessary [refer to Japanese Patent Application Laid-Open (KOKAI) Nos. 61-266311 (1986) and 55-104923 (1980)], and a process of producing plate-like magnetite particles directly from an aqueous solution refer to Japanese Patent Application Laid-Open (KOKAI) No. 62-34141).

Poreless plate-like magnetite particles which have as large a plate ratio (average particle diameter/thickness) as possible and which are discrete each other, are now strongly demanded, but particles having satisfactory properties have not been obtained by the above-described known methods.

In a process of producing plate-like hematite particles from an aqueous solution and heat-treating these particles, a sintering of particle and between particles occurs in the heat-treating process, which makes it difficult to disperse the particles in a vehicle or a resin.

In the case of producing plate-like goethite particles from an aqueous solution and after, if necessary, dehydrating the particles under heating, the obtained plate-like magnetite particles have many pores on the particle surface and in the inside of particle as a result of dehydration in the goethite crystal particles, and a sintering of particle and between particles occurs, when they are heated. If such porous magnetite particles are dispersed in a vehicle or a resin, other fine particles are attracted to the portion at which surface magnetic poles are generated. As a result, a multiplicity of particles agglomerate and a considerably large agglomerated lumps are produced, which make dispersion difficult.

By a process of producing plate-like magnetite particles directly from an aqueous solution, the particles obtained are discrete from each other and poreless, but the plate ratio (average particle diameter/thickness) is at most about 9:1, and particles having a large plate ratio have not been obtained.

As a result of the studies undertaken by the present inventors, it has been found that the particles obtained by oxidizing a suspension containing $FeCO_3$ obtained by reacting an aqueous ferrous salt solution and an aqueous alkali carbonate solution by passing an oxygen-containing gas therethrough, wherein the suspension is obtained by reacting a ferrous salt solution containing 0.2 to 5.0 mol % of a ferric salt, calculated as Fe(III), based on Fe(II) and an aqueous alkali carbonate the amount of which is so controlled that the equivalent ratio of an alkali carbonate to the Fe(II) and Fe(III) in the aqueous ferrous salt solution is not less than 1 and the following general formula is satisfied:

$$\text{Equivalent ratio} \left( \frac{CO_3^{2-} (\text{mol})}{Fe^{2+} (\text{mol})} \right) \leq \frac{0.13}{\left( \text{concentration of } FeCO_3 \, (\text{mol/l}) \right)^2} + 0.5,$$

and if necessary, 0.01 to 8.0 mol % of a water-soluble organic compound having a —COONa or —COOK group based on the Fe(II) and Fe(III) are added to any of the aqueous ferrous salt solution, the aqueous alkali carbonate solution and the suspension containing FeCO₃ before being oxidized by passing the oxygen-containing gas therethrough, are poreless plate-like magnetite particles which have as large a plate ratio (average particle diameter/thickness) as possible and which are discrete each other. On the basis of this finding, the present invention has been achieved.

SUMMARY OF THE INVENTION

In a first aspect of the present invention, there is provided a process for producing poreless plate-like magnetite particles which have an average particle diameter of 0.1 to 1.5 μm, a plate ratio of 11:1 to 20:1 and a specific surface area of 2.0 to 30.0 m²/g, and which are discrete each other, the process comprising the steps of: reacting a ferrous salt solution containing 0.2 to 5.0 mol % of a ferric salt, calculated as Fe(III), based on Fe(II) and an aqueous alkali carbonate the amount of which is so controlled that the equivalent ratio of the alkali carbonate to the Fe(II) and Fe(III) in the aqueous ferrous salt solution is not less than 1 and the following general formula is satisfied:

$$\text{Equivalent ratio} \left( \frac{CO_3^{2-} \text{ (mol)}}{Fe^{2+} \text{ (mol)}} \right) \leq \frac{0.13}{\left( \text{concentration of } FeCO_3 \text{ (mol/l)} \right)^2} + 5.0,$$

and oxidizing the thus-obtained suspension containing FeCO₃ by passing an oxygen-containing gas therethrough, thereby obtaining the plate-like magnetite particles from the aqueous solution.

In a second aspect of the present invention, there is provided a process for producing poreless plate-like magnetite particles which have an average particle diameter of 0.1 to 1.5 μm, a plate ratio of 21:1 to 50:1 and a specific surface area of 3.0 to 30.0 m²/g, and which are discrete each other, the process comprising the steps of: reacting a ferrous salt solution containing 0.2 to 5.0 mol % of a ferric salt, calculated as Fe(III), based on Fe(II) and an aqueous alkali carbonate the amount of which is so controlled that the equivalent ratio of the alkali carbonate to the Fe(II) and Fe(III) in the aqueous ferrous salt solution is not less than 1 and the following general formula is satisfied:

$$\text{Equivalent ratio} \left( \frac{CO_3^{2-} \text{ (mol)}}{Fe^{2+} \text{ (mol)}} \right) \leq \frac{0.13}{\left( \text{concentration of } FeCO_3 \text{ (mol/l)} \right)^2} + 5.0,$$

in which 0.01 to 8.0 mol % of a water-soluble organic compound having a —COONa or —COOK group based on the Fe(II) and Fe(III) are added to any of the aqueous ferrous salt solution, the aqueous alkali carbonate solution and the suspension containing FeCO₃ before oxidation; and oxidizing the thus-obtained suspension containing FeCO₃ by passing an oxygen-containing gas therethrough, thereby obtaining the plate-like magnetite particles from the aqueous solution.

In a third aspect of the present invention, there are provided poreless plate-like magnetite particles having an average particle diameter of 0.1 to 0.5 μm, a plate ratio of 11:1 to 20:1 and a specific surface area of 2.0 to 30.0 m²/g, which are discrete from each other.

In a fourth aspect of the present invention, there are provided poreless plate-like magnetite particles having an average particle diameter of 0.1 to 0.5 μm, a plate ratio of 21:1 to 50:1 and a specific surface area of 3.0 to 30.0 m²/g, which are discrete from each other.

BRIEF DESCRIPTION OF THE DRAWINGS

FIGS. 1, 3, 4 and 6 to 8 are electron micrographs, wherein

FIGS. 1, 3 and 6 to 8 show the structure of the plate-like magnetite particles obtained in Example 1, Example 3, Example 8, Example 10 and Example 12, respectively, and FIG. 4 shows the structure of the mixed particles of the plate-like magnetite particles and spindle-like hematite particles obtained in Comparative Example 1;

DETAILED DESCRIPTION OF THE INVENTION

Figure 2:
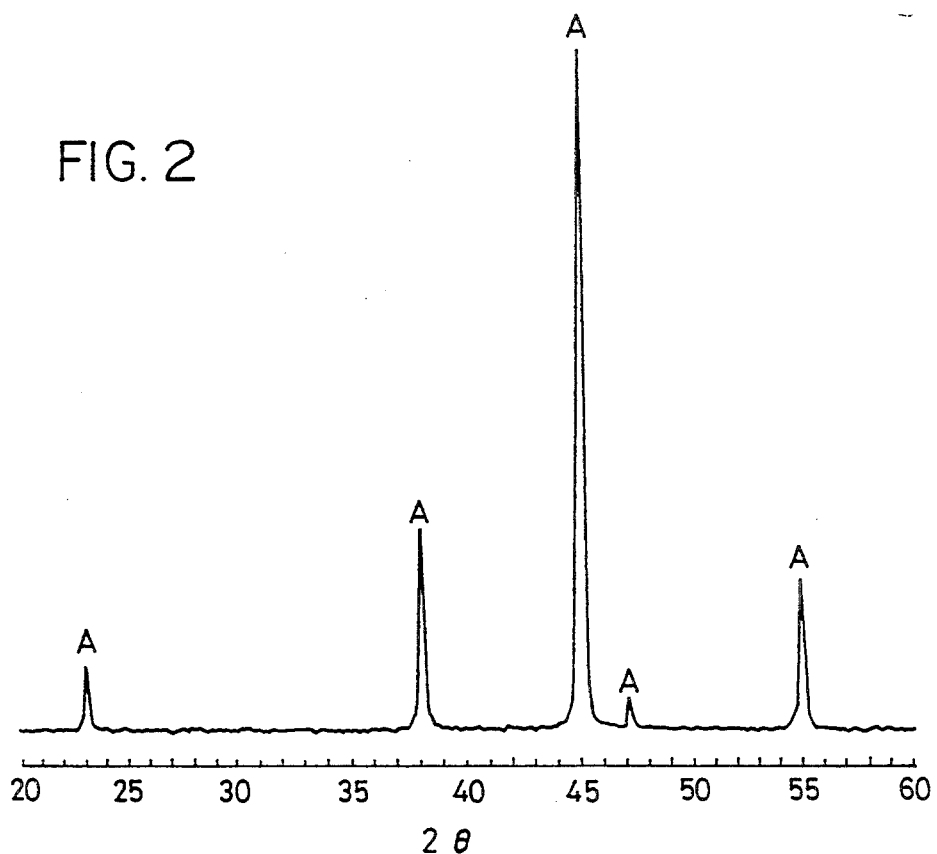
FIGS. 2 and 5 are X-ray diffraction patterns of the plate-like magnetite particles obtained in Example 1 and the mixed particles of the plate-like magnetite particles and spindle-like hematite particles obtained in Comparative Example 1, respectively, wherein the peak A indicates the magnetite particles and the peak B the hematite particles.

Plate-like magnetite particles obtained by a process according to the present invention have an average particle diameter of 0.1 to 1.5 μm and a plate ratio (average particle diameter/thickness) of 11:1 to 20:1, and are discrete each other. Since these particles are poreless, the specific surface area thereof is as small as 2.0 to 30.0 m²/g.

In the case of adding a specified amount of water-soluble organic compound having —COONa or —COOK group to either of the aqueous ferrous salt solution, the aqueous alkali carbonate solution or the suspension containing FeCO₃ before being oxidized by passing the oxygen-containing gas therethrough, it is possible to produce plate-like magnetite particles having a larger plate ratio (average particle diameter/thickness) directly from the aqueous solution. The particles obtained have an average particle diameter of 0.1 to 1.5 μm and a plate ratio (average particle diameter/thickness) of 21–50:1, and are discrete each other. Since these particles are poreless, the specific surface area thereof is as small as 3.0 to 30.0 m²/g.

As an aqueous ferrous salt solution used in the present invention, an aqueous ferrous sulfate solution, aqueous ferrous chloride solution etc. are usable.

As an aqueous ferric salt solution used in the present invention, an aqueous ferric sulfate solution, an aqueous ferric chloride solution, etc. may be exemplified. The amount of ferric salt is 0.1 to 5.5 mol %, preferably 0.2 to 5.0 mol %, calculated as Fe(III), based on the Fe(II) in the aqueous ferrous salt solution.

If it is less than 0.1 mol %, it is difficult to obtain plate-like magnetite particles having a large plate ratio (average particle diameter/thickness), which is the object of the present invention.

If it exceeds 5.5 mol %, spindle-like hematite particles get mixed in the plate-like magnetite particles.

As an alkali carbonate in the present invention, sodium carbonate, potassium carbonate, ammonium carbonate, etc. are used singly or in the form of a mixture.

The mixing order of an aqueous ferrous salt solution and an aqueous alkali carbonate solution is not specified, either may be added to the other or both may be mixed with each other simultaneously.

The reaction temperature in the present invention is 75° to 100° C. If it is lower than 75° C., spindle-like hematite particles or acicular goethite particles get mixed in the plate-like magnetite particles. Even if it exceeds 100° C., the object of the present invention can be achieved, but it is uneconomical because a special equipment such as an autoclave is required.

The amount of alkali carbonate used in the present invention is so controlled that the equivalent ratio of the alkali carbonate to the Fe(II) and Fe(III) in the aqueous ferrous salt solution is not less than 1 and the following general formula is satisfied.

$$\text{Equivalent ratio} \left( \frac{CO_3^{2-} \text{ (mol)}}{Fe^{2+} \text{ (mol)}} \right) \leq \frac{0.13}{\left( \text{concentration of } FeCO_3 \text{ (mol/l)}^2 \right)} + 5.0,$$

If the amount exceeds the above-described specified range, spindle-like hematite particles get mixed in the plate-like magnetite particles. When the productivity is taken into consideration, the concentration of iron is preferably not less than about 0.1 mol/l.

As the water-soluble organic compound having a —COONa or —COOK group in the present invention, sodium acetate, potassium acetate, sodium tartrate, potassium tartrate, sodium citrate, potassium citrate, sodium propionate, potassium propionate, etc. are usable.

The amount of water-soluble organic compound having a —COONa or —COOK group added in the present invention is 0.01 to 8.0 mol %, preferably 0.01 to 7.0 mol % based on the Fe(II) and Fe(III) in the aqueous ferrous salt solution.

If it is less than 0.01 mol %, it is difficult to obtain plate-like magnetite particles having a larger plate ratio (average particle diameter/thickness).

If it exceeds 8.0 mol %, spindle-like hematite particles get mixed in the plate-like magnetite particles.

Since the water-soluble organic compound having a —COONa or —COOK group in the present invention influences the form of the particles produced such as the plate ratio, it is necessary to add the water-soluble organic compound before the production reaction of the plate-like magnetite particles.

The water-soluble organic compound may be added to any of the aqueous ferrous salt solution, the aqueous alkali carbonate solution and the suspension containing $FeCO_3$ before being oxidized by passing an oxygen-containing gas therethrough.

As the oxygen-containing gas, air is preferable. The ratio of the oxygen-containing gas supplied and the supplying time are not specified and an ordinary method is adopted.

The plate-like magnetite particles obtained by a method according to the present invention, that is, (1) plate-like magnetite particles which have an average particle diameter of 0.1 to 0.5 μm and a plate ratio of 11–20/1, which are discrete each other, and which have a specific surface area of 2.0 to 30.0 m²/g, preferably 5.0 to 30.0 m²/g due to the porelessness, when a concentration of Fe(II) and Fe(III) in the suspension is less than 0.3 mol/l, and (2) plate-like magnetite particles which have an average particle diameter of 0.1 to 0.5 μm and a plate ratio of 21–50/1, preferably 21–40/1, which are discrete each other, and which have a specific surface area of 3.0 to 30.0 m²/g, preferably 6.0 to 30.0 m²/g due to the porelessness, when a concentration of Fe(II) and Fe(III) in the suspension is not less than 0.3 mol/l, are novel and have a high packing density in a vehicle or a resin, excellent dispersibility and orientation property, and a high contacting ratio between the particles, so that these particles are useful as a material for an electromagnetic wave absorber, shield, anticorrosive coating, toner, damper, sound insulator and a magnetic recording material.

According to the method of the present invention, since it is possible to obtain particles which have the form of a plate, and have a large plate ratio (average particle diameter/thickness) such as not less than 11:1. In addition, since the particles are produced directly from an aqueous solution, the particles are discrete each other and poreless, so that the packing density in a vehicle or a resin is high and the dispersibility, the orientation property are excellent and the ratio of contact between the particles are also high. Thus, these particles are useful as a material for an electromagnetic wave absorber, shield, anticorrosive coating, toner, damper, sound insulator and a magnetic recording material.

EXAMPLES

The present invention is explained in more detail in the following Examples; however, it should be recognized that the scope of the present invention is not restricted to these Examples.

The average particle diameter in the following Examples and Comparative Examples are values obtained by the measurement from an electron micrograph. The specific surface area was measured by a BET method, and the thickness and the plate ratio were expressed by the values obtained from the specific surface area measured by the BET method and the average particle diameter. The magnetism was measured by a vibrating sample magnetometer model VSMP-1 (produced by Toei Kogyo Co., Ltd.) under a measuring magnetic field of 10 KOe.

Example 1

An aqueous solution of 0.34 mol/l of $Na_2CO_3$ was prepared in a reaction vessel. To 44.3 l of the thus-prepared aqueous solution, 5.7 l of the aqueous solution of 1.75 mol/l of ferrous sulfate containing 0.009 mol/l of ferric sulfate (the amount of Fe(III) is equivalent to 0.5 mol % of Fe(II)) was added ($CO_3$/Fe=1.5 equivalents) in the stream of $N_2$ gas at a temperature of 90° C., thereby producing $FeCO_3$ (The concentration of Fe(II) and Fe(III) therein was 0.2 mol/l). $N_2$ gas was continuously blown into the aqueous solution containing $FeCO_3$ at a rate of 50 l per minute at 90° C. for 60 minutes so as to age the aqueous solution. Thereafter, air was passed through the aqueous solution at a rate of 60 l per minute at 90° C. for 10 hours, thereby producing particles.

The particles produced were filtered, washed with water, dried and disaggregated by an ordinary method. The obtained plate-like particles had an average particle diameter of 0.13 μm, and a plate ratio (average particle diameter/thickness) of 11:1, as shown in the transmission electron micrograph (×50,000) of FIG. 1. No pore existed on the surface or the interior of the particles.

The BET specific surface area of the obtained particles was 24.2 m²/g and as to the magnetic characteristics, the coercive force (Hc) was 115 Oe, the saturation magnetization ($\sigma s$) was 85.7 emu/g, and the squareness ($\sigma r/\sigma s$) was 0.093.

FIG. 2 is an X-ray diffraction pattern of the particles. As is seen from FIG. 2, the peak A indicates the magnetite particles and the obtained particles are magnetite particles.

Example 2

An aqueous solution of 1.09 mol/l of $Na_2CO_3$ was prepared in a reaction vessel. To 41.4 l of the thus-prepared aqueous solution, 8.6 l of an aqueous solution of 1.75 mol/l of ferrous sulfate containing 0.035 mol/l of ferric sulfate (the amount of Fe(III) is equivalent to 2.0 mol % of Fe(II)) was added ($CO_3/Fe = 3.0$ equivalents) in the stream of $N_2$ gas at a temperature of 90° C., thereby producing $FeCO_3$ (The concentration of Fe(II) and Fe(III) therein was 0.31 mol/l). $N_2$ gas was continuously blown into the aqueous solution containing $FeCO_3$ at a rate of 50 l per minute at 90° C. for 60 minutes so as to age the aqueous solution. Thereafter, air was passed through the aqueous solution at a rate of 60 l per minute at 90° C. for 10 hours, thereby producing particles.

The particles produced were filtered, washed with water, dried and disaggregated by an ordinary method. From the observation through a transmission electron microscope, it was found that the obtained plate-like particles had an average particle diameter of 0.56 μm, and a plate ratio (average particle diameter/thickness) of 15:1. No pore existed on the surface or the interior of the particles.

The BET specific surface area of the obtained particles was 7.4 m²/g and as to the magnetic characteristics, the coercive force (Hc) was 93 Oe, the saturation magnetization ($\sigma s$) was 87.6 emu/g, and the squareness ($\sigma r/\sigma s$) was 0.105.

As a result of X-ray diffraction, only the peak indicating magnetite particles was observed and it was found that the obtained particles were magnetite particles.

Example 3

An aqueous solution of 1.64 mol/l of $Na_2CO_3$ was prepared in a reaction vessel and 22.1 g of sodium citrate was added to the obtained aqueous solution of $Na_2CO_3$ so that 0.5 mol % of sodium citrate was contained on the basis of the Fe in the aqueous ferrous sulfate solution. To 41.4 l of the thus-prepared aqueous solution of $Na_2CO_3$, 8.6 l of an aqueous solution of 1.75 mol/l of ferrous sulfate containing 0.026 mol/l of ferric sulfate (the amount of Fe(III) is equivalent to 4.0 mol % of Fe(II)) was added ($CO_3/Fe = 4.5$ equivalents) in the stream of $N_2$ gas at a temperature of 90° C., thereby producing $FeCO_3$ (The concentration of Fe(II) and Fe(III) therein was 0.32 mol/l). Air was passed through the aqueous solution containing $FeCO_3$ at a rate of 60 l per minute at 90° C. for 10 hours, thereby producing particles.

The particles produced were filtered, washed with water, dried and disaggregated by an ordinary method. The obtained plate-like particles had an average particle diameter of 0.62 μm, and a plate ratio (average particle diameter/thickness) of 26:1, as shown in the transmission electron micrograph (×30,000) of FIG. 3. No pore existed on the surface or the interior of the particles.

The BET specific surface area of the obtained particles was 8.6 m²/g, and as to the magnetic characteristics, the coercive force (Hc) was 82 Oe, the saturation magnetization ($\sigma s$) was 88.9 emu/g, and the squareness ($\sigma r/\sigma s$) was 0.098.

As a result of X-ray diffraction, only the peak indicating magnetite particles was observed and it was found that the obtained particles were magnetite particles.

Example 4

Particles were produced in the same way as in Example 3 except that 30.6 g of sodium acetate was used instead of sodium citrate so that 1.5 mol % of sodium acetate was contained on the basis of the Fe in the aqueous ferrous sulfate solution (The concentration of Fe(II) and Fe(III) therein was 0.32 mol/l).

The particles produced were filtered, washed with water, dried and disaggregated by an ordinary method. From the observation through a transmission electron microscope, it was found that the obtained plate-like particles had an average particle diameter of 0.72 μm, and a plate ratio (average particle diameter/thickness) of 23:1. No pore existed on the surface or the interior of the particles.

The BET specific surface area of the obtained particles was 6.8 m²/g and as to the magnetic characteristics, the coercive force (Hc) was 87 Oe, the saturation magnetization ($\sigma s$) was 88.2 emu/g, and the squareness ($\sigma r/\sigma s$) was 0.101.

As a result of X-ray diffraction, only the peak indicating magnetite particles was observed and it was found that the obtained particles were magnetite particles.

Example 5

An aqueous solution of 1.09 mol/l of $Na_2CO_3$ was prepared in a reaction vessel and 173 g of sodium tartrate was added to the obtained aqueous solution of $Na_2CO_3$ so that 5.0 mol % of sodium tartrate was contained on the basis of the Fe in the aqueous ferrous sulfate solution. To 41.4 l of the aqueous solution of $Na_2CO_3$, 8.6 l of an aqueous solution of 1.75 mol/l of ferrous sulfate containing 0.026 mol/l of ferric sulfate (the amount of Fe(III) is equivalent to 1.5 mol % of Fe(II)) was added ($CO_3/Fe = 3.0$ equivalents) in the stream of $N_2$ gas at a temperature of 90° C., thereby producing $FeCO_3$ (The concentration of Fe(II) and Fe(III) therein was 0.31 mol/l). $N_2$ gas was continuously blown into the aqueous solution containing $FeCO_3$ at a rate of 50 l per minute at 90° C. for 60 minutes so as to age the aqueous solution. Thereafter, air was passed through the aqueous solution containing $FeCO_3$ at a rate of 60 l per minute at 90° C. for 10 hours, thereby producing particles.

The particles produced were filtered, washed with water, dried and disaggregated by an ordinary method. From the observation through a transmission electron microscope it was found that the obtained plate-like particles had an average particle diameter of 0.53 μm, and a plate ratio (average particle diameter/thickness) of 34:1. No pore existed on the surface or the interior of the particles.

The BET specific surface area of the obtained particles was 11.2 m²/g and as to the magnetic characteristics, the coercive force (Hc) was 80 Oe, the saturation magnetization ($\sigma s$) was 89.1 emu/g, and the squareness ($\sigma r/\sigma s$) was 0.101.

As a result of X-ray diffraction, only the peak indicating magnetite particles was observed and it was found that the obtained particles were magnetite particles.

Comparative Example 1

Particles were produced from an aqueous solution in the same way as in Example 1 except for using 8.6 l of an aqueous solution of 1.75 mol/l of ferrous sulfate containing 0.105 mol/l of ferric sulfate (the amount of Fe(III) is equivalent to 6.0 mol % of Fe(II)).

The particles produced were filtered, washed with water, dried and disaggregated by an ordinary method. The obtained particles were a mixture of plate-like particles and spindle-shaped particles, as shown in the transmission electron micrograph ($\times 20{,}000$) of FIG. 4.

Figure 5:
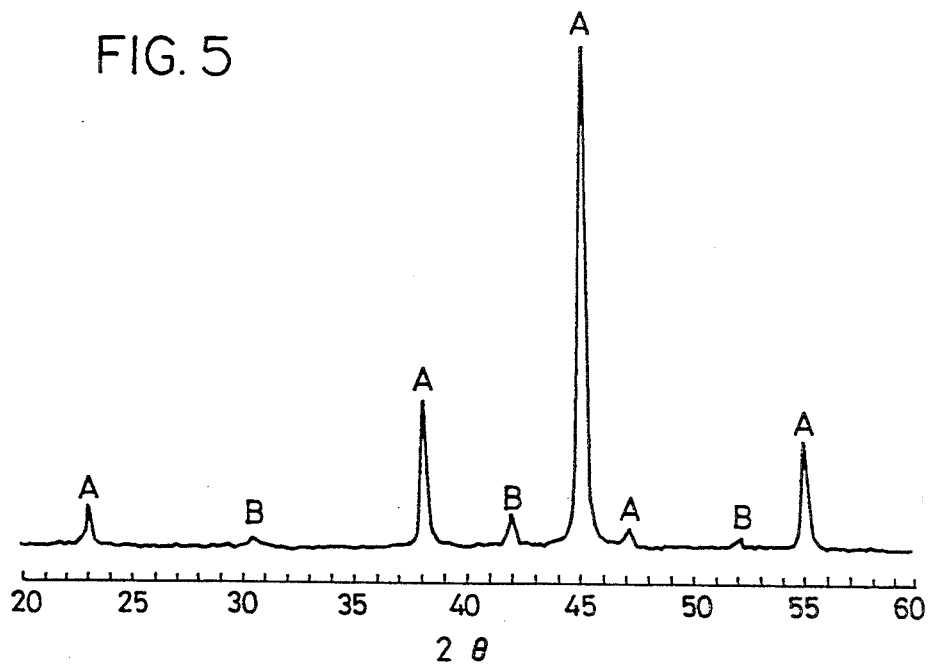

As a result of X-ray diffraction, the peak indicating magnetite particles and the peak indicating hematite particles were observed, as shown in FIG. 5.

In FIG. 5, the peak A indicates magnetite particles and the peak B hematite particles.

Comparative Example 2

Particles were produced from an aqueous solution in the same way as in Example 3 except for changing the amount of sodium citrate to 443 g (equivalent to 10 mol % of the Fe in the aqueous ferrous sulfate solution). The particles produced were filtered, washed with water, dried and disaggregated by an ordinary method. From the observation through a transmission electron microscope, it was found that the obtained particles were a mixture of plate-like particles and granular particles. As a result of X-ray diffraction, it was observed that hematite particles were mixed with magnetite particles.

Example 6

An aqueous solution of 0.51 mol/l of $Na_2CO_3$ was prepared in a reaction vessel. To 43.6 l of the thus-prepared aqueous solution of $Na_2CO_3$, 6.4 l of an aqueous solution of 1.75 mol/l of ferrous sulfate containing 0.018 mol/l of ferric sulfate (the amount of Fe(III) is equivalent to 1.0 mol % of Fe(II)) was added ($CO_3/Fe=2.0$ equivalents) in the stream of $N_2$ gas at a temperature of 90° C., thereby producing $FeCO_3$ (The concentration of Fe(II) and Fe(III) therein was 0.23 mol/l). $N_2$ gas was continuously blown into the aqueous solution containing $FeCO_3$ at a rate of 50 l per minute so as to age the aqueous solution at 90° C. for 30 minutes. Thereafter, air was passed through the aqueous solution at a rate of 60 l per minute at 90° C. for 10 hours, thereby producing particles.

The particles produced were filtered, washed with water, dried and disaggregated by an ordinary method. From the observation through a transmission electron microscope, it was found that the obtained plate-like particles had an average particle diameter of 0.18 µm, and a plate ratio (average particle diameter/thickness) of 13:1. No pore existed on the surface or the interior of the particles.

The BET specific surface area of the obtained particles was 21.8 m²/g and as to the magnetic characteristics, the coercive force (Hc) was 110 Oe, the saturation magnetization ($\sigma s$) was 85.8 emu/g, and the squareness ($\sigma r/\sigma s$) was 0.101.

As a result of X-ray diffraction, only the peak indicating magnetite particles was observed and it was found that the obtained particles were magnetite particles.

Example 7

An aqueous solution of 0.72 mol/l of $Na_2CO_3$ was prepared in a reaction vessel. To 42.9 l of the thus-prepared aqueous solution of $Na_2CO_3$, 7.1 l of an aqueous solution of 1.75 mol/l of ferrous sulfate containing 0.035 mol/l of ferric sulfate (the amount of Fe(III) is equivalent to 2.0 mol % of Fe(II)) was added ($CO_3/Fe=2.5$ equivalents) in the stream of $N_2$ gas at a temperature of 90° C., thereby producing $FeCO_3$ (The concentration of Fe(II) and Fe(III) therein was 0.25 mol/l). $N_2$ gas was continuously blown into the aqueous solution containing $FeCO_3$ at a rate of 50 l per minute at 90° C. for 30 minutes so as to age the aqueous solution. Thereafter, air was passed through the aqueous solution at a rate of 60 l per minute at 90° C. for 10 hours, thereby producing particles.

The particles produced were filtered, washed with water, dried and disaggregated by an ordinary method. From the observation through a transmission electron microscope, it was found that the obtained plate-like particles had an average particle diameter of 0.33 µm, and a plate ratio (average particle diameter/thickness) of 14:1. No pore existed on the surface or the interior of the particles.

The BET specific surface area of the obtained particles was 13.8 m²/g, and as to the magnetic characteristics, the coercive force (Hc) was 92 Oe, the saturation magnetization ($\sigma s$) was 87.1 emu/g, and the squareness ($\sigma r/\sigma s$) was 0.095.

As a result of X-ray diffraction, only the peak indicating magnetite particles was observed and it was found that the obtained particles were magnetite particles.

Example 8

An aqueous solution of 1.17 mol/l of $Na_2CO_3$ was prepared in a reaction vessel. To 42.9 l of the thus-prepared aqueous solution of $Na_2CO_3$, 7.1 l of an aqueous solution of 1.75 mol/l of ferrous sulfate containing 0.07 mol/l of ferric sulfate (the amount of Fe(III) is equivalent to 4.0 mol % of Fe(II)) was added ($CO_3/Fe=4.0$ equivalents) in the stream of $N_2$ gas at a temperature of 90° C., thereby producing $FeCO_3$ (The concentration of Fe(II) and Fe(III) therein was 0.26 mol/l). $N_2$ gas was continuously blown into the aqueous solution containing $FeCO_3$ at a rate of 50 l per minute at 90° C. for 30 minutes so as to age the aqueous solution. Thereafter, air was passed through the aqueous solution at a rate of 60 l per minute at 90° C. for 10 hours, thereby producing particles.

The particles produced were filtered, washed with water, dried and disaggregated by an ordinary method. From the observation through a transmission electron micrograph, it was found that the obtained plate-like particles had an average particle diameter of 0.47 µm, and a plate ratio (average particle diameter/thickness) of 18:1, as shown in the transmission electron micrograph ($\times 30{,}000$) of FIG. 6. No pore existed on the surface or the interior of the particles.

The BET specific surface area of the obtained particles was 9.8 m²/g, and as to the magnetic characteristics, the coercive force (Hc) was 81 Oe, the saturation magnetization ($\sigma s$) was 88.1 emu/g, and the squareness ($\sigma r/\sigma s$) was 0.100.

As a result of X-ray diffraction, only the peak indicating magnetite particles was observed and it was found that the obtained particles were magnetite particles.

Example 9

An aqueous solution of 0.45 mol/l of $Na_2CO_3$ was prepared in a reaction vessel and 14.7 g of sodium citrate was added to the obtained aqueous solution of $Na_2CO_3$ so that 0.5 mol % of sodium citrate was contained on the basis of the Fe in the aqueous ferrous sulfate solution. To 44.3 l of the aqueous solution of $Na_2CO_3$, 5.7 l of an aqueous solution of 1.75 mol/l of ferrous sulfate containing 0.009 mol/l of ferric sulfate (the amount of Fe(III) is equivalent to 0.5 mol % of Fe(II) was added ($CO_3$/Fe=2.0 equivalents) in the stream of $N_2$ gas at a temperature of 90° C., thereby producing $FeCO_3$ (The concentration of Fe(II) and Fe(III) therein was 0.2 mol/l). Air was passed through the aqueous solution containing $FeCO_3$ at a rate of 60 l per minute at 90° C. for 10 hours, thereby producing particles.

The particles produced were filtered, washed with water, dried and disaggregated by an ordinary method. From the observation through a transmission electron microscope, it was found that the obtained plate-like particles had an average particle diameter of 0.12 μm, and a plate ratio (average particle diameter/thickness) of 21:1. No pore existed on the surface or the interior of the particles.

The BET specific surface area of the obtained particles was 25.6 m$^2$/g, and as to the magnetic characteristics, the coercive force (Hc) was 111 Oe, the saturation magnetization ($\sigma$s) was 85.9 emu/g, and the squareness ($\sigma$r/$\sigma$s) was 0.111.

As a result of X-ray diffraction, only the peak indicating magnetite particles was observed and it was found that the obtained particles were magnetite particles.

Example 10

An aqueous solution of 0.72 mol/l of $Na_2CO_3$ was prepared in a reaction vessel and 14.7 g of sodium citrate was added to the obtained aqueous solution of $Na_2CO_3$ so that 0.5 mol % of sodium citrate was contained on the basis of the Fe in the aqueous ferrous sulfate solution. To 42.9 l of the aqueous solution of $Na_2CO_3$, 7.1 l of an aqueous solution of 1.75 mol/l of ferrous sulfate containing 0.018 mol/ of ferric sulfate (the amount of Fe(III) is equivalent to 1.0 mol % of Fe(II)) was added ($CO_3$/Fe=2.5 equivalents) in the stream of $N_2$ gas at a temperature of 90° C., thereby producing $FeCO_3$ (The concentration of Fe(II) and Fe(III) therein was 0.25 mol/l). Air was passed through the aqueous solution containing $FeCO_3$ at a rate of 60 l per minute at 90° C. for 10 hours, thereby producing particles.

The particles produced were filtered, washed with water, dried and disaggregated by an ordinary method. From the observation through a transmission electron micrograph, it was found that the obtained plate-like particles had an average particle diameter of 0.23 μm, and a plate ratio (average particle diameter/thickness) of 25:1, as shown in the transmission electron micrograph (×30,000) of FIG. 7. No pore existed on the surface or the interior of the particles.

The BET specific surface area of the obtained particles was 19.1 m$^2$/g and as to the magnetic characteristics, the coercive force (Hc) was 102 Oe, the saturation magnetization ($\sigma$s) was 86.1 emu/g, and the squareness ($\sigma$r/$\sigma$s) was 0.098.

As a result of X-ray diffraction, only the peak indicating magnetite particles was observed and it was found that the obtained particles were magnetite particles.

Example 11

An aqueous solution of 1.00 mol/l of $Na_2CO_3$ was prepared in a reaction vessel and 20.6 g of sodium citrate was added to the obtained aqueous solution of $Na_2CO_3$ so that 0.5 mol % of sodium citrate was contained on the basis of the Fe in the aqueous ferrous sulfate solution. To 42.0 l of the aqueous solution of $Na_2CO_3$, 8.0 l of an aqueous solution of 1.75 mol/l of ferrous sulfate containing 0.009 mol/l of ferric sulfate (the amount of Fe(III) is equivalent to 0.5 mol % of Fe(II)) was added ($CO_3$/Fe=3.0 equivalents) in the stream of $N_2$ gas at a temperature of 90° C., thereby producing $FeCO_3$ (The concentration of Fe(II) and Fe(III) therein was 0.28 mol/l). Air was passed through the aqueous solution containing $FeCO_3$ at a rate of 60 l per minute at 90° C. for 10 hours, thereby producing particles.

The particles produced were filtered, washed with water, dried and disaggregated by an ordinary method. From the observation through a transmission electron microscope, it was found that the obtained plate-like particles had an average particle diameter of 0.31 μm, and a plate ratio (average particle diameter/thickness) of 28:1. No pore existed on the surface or the interior of the particles.

The BET specific surface area of the obtained particles was 17.5 m$^2$/g, and as to the magnetic characteristics, the coercive force (Hc) was 93 Oe, the saturation magnetization ($\sigma$s) was 86.4 emu/g, and the squareness ($\sigma$r/$\sigma$s) was 0.103.

As a result of X-ray diffraction, only the peak indicating magnetite particles was observed and it was found that the obtained particles were magnetite particles.

Example 12

An aqueous solution of 1.47 mol/l of $Na_2CO_3$ was prepared in a reaction vessel and 34.8 g of sodium tartrate was added to the obtained aqueous solution of $Na_2CO_3$ so that 1.0 mol % of sodium tartrate was contained on the basis of the Fe in the aqueous ferrous sulfate solution. To 42.0 l of the aqueous solution of $Na_2CO_3$, 8.0 l of an aqueous solution of 1.75 mol/l of ferrous sulfate containing 0.035 mol/l of ferric sulfate (the amount of Fe(III) is equivalent to was 2.0 mol % of Fe(II)) was added ($CO_3$/Fe=4.0 equivalents) in the stream of $N_2$ gas at a temperature of 90° C., thereby producing $FeCO_3$ (The concentration of Fe(II) and Fe(III) therein was 0.29 mol/l). Air was passed through the aqueous solution containing $FeCO_3$ at a rate of 60 l per minute at 90° C. for 10 hours, thereby producing particles.

The particles produced were filtered, washed with water, dried and disaggregated by an ordinary method. From the observation through a transmission electron micrograph, it was found that the obtained plate-like particles had an average particle diameter of 0.43 μm, and a plate ratio (average particle diameter/thickness) of 31:1, as shown in the transmission electron micrograph (×20,000) of FIG. 8. No pore existed on the surface or the interior of the particles.

The BET specific surface area of the obtained particles was 12.1 m$^2$/g, and as to the magnetic characteristics, the coercive force (Hc) was 88 Oe, the saturation magnetization ($\sigma$s) was 86.9 emu/g, and the squareness ($\sigma$r/$\sigma$s) was 0.106.

As a result of X-ray diffraction, only the peak indicating magnetite particles was observed and it was found that the obtained particles were magnetite particles.

What is claimed is:

1. Poreless, plate-shaped magnetite particles having an average particle diameter of 0.1 to 0.5 μm, a plate ratio of 11:1 to 20:1 and a specific surface area of 2.0 to 30.0 m²/g, which particles are discrete from each other.

2. Poreless, plate-shaped magnetite particles according to claim 1 obtained by:

(a) reacting a ferrous salt solution containing 0.2 to 5.0 mol % of a ferric salt, calculated as Fe(III), based on Fe(II), and an aqueous alkali carbonate, the amount of which is controlled so that the equivalent ratio of the alkali carbonate to the Fe(II) and Fe(III) in said aqueous ferrous salt solution is not less than 1, and the following formula is satisfied:

$$\text{Equivalent ratio} \left( \frac{CO_3^{2-} \text{ (mol)}}{Fe^{2+} \text{ (mol)}} \right) \leq \frac{0.13}{\left( \text{concentration of } FeCO_3 \text{ (mol/l)} \right)^2} + 5.0,$$

the concentration of Fe(II) and Fe(III) in the suspension being less than 0.3 mol/l; and (b) oxidizing the thus-obtained FeCO₃-containing suspension by passing an oxygen-containing gas therethrough.

3. Poreless, plate-shaped magnetite particles according to claim 1 obtained by:

(a) reacting a ferrous salt solution containing 0.2 to 5.0 mol % of a ferric salt, calculated as Fe(III), based on Fe(II), and an aqueous alkali carbonate, the amount of which is controlled so that the equivalent ratio of the alkali carbonate to the Fe(II) and Fe(III) in said aqueous ferrous-salt solution is not less than 1, and the following formula is satisfied:

$$\text{Equivalent ratio} \left( \frac{CO_3^{2-} \text{ (mol)}}{Fe^{2+} \text{ (mol)}} \right) \leq \frac{0.13}{\left( \text{concentration of } FeCO_3 \text{ (mol/l)} \right)^2} + 5.0,$$

in which from 0.01 to 8.0 mol % of a water-soluble organic compound having a —COONa or —COOK group, based on said Fe(II) and said Fe(III), are added to said aqueous ferrous salt solution to produce a suspension containing FeCO₃, said aqueous alkali carbonate solution and the suspension containing FeCO₃ before oxidation and a concentration of Fe(II) and Fe(III) in the suspension being not less than 0.3 mol/l; and thereafter (b) oxidizing the thus-obtained FeCO₃-containing suspension by passing an oxygen-containing gas therethrough.

4. Poreless, plate-shaped magnetite particles having an average particle diameter of 0.1 to 0.5 μm, a plate ratio of 21:1 to 50:1 and a specific surface area of 3.0 to 30.0 m²/g, which particles are discrete from each other.

* * * * *